United States Patent [19]

Kawase et al.

[11] 3,725,530
[45] Apr. 3, 1973

[54] METHOD OF REMOVING MERCURY VAPOR FROM GASES

[75] Inventors: Buntaro Kawase, Tokyo; Iwao Kojima; Kunio Otani, both of Kawasaki, all of Japan

[73] Assignee: Showa Denko K.K., Tokyo, Japan

[22] Filed: Jan. 18, 1971

[21] Appl. No.: 107,576

[30] Foreign Application Priority Data

June 23, 1970 Japan .................................. 45/54089

[52] U.S. Cl. .................. 423/210, 423/592, 423/644, 75/121, 204/99
[51] Int. Cl. ............................................ B01d 53/34
[58] Field of Search ............ 23/2 R, 4, 117, 210, 183; 204/99, 105, 129, 75, 155; 75/121; 55/72; 423/210, 215

[56] References Cited

UNITED STATES PATENTS

| | | |
|---|---|---|
| 1,984,164 | 12/1934 | Stock .......................................... 23/4 |
| 2,300,965 | 11/1942 | Randall .................................. 23/4 X |
| 2,774,736 | 12/1956 | Stieh......................................... 23/4 X |
| 3,194,629 | 7/1965 | Dreibelbis et al........................ 23/4 X |

*Primary Examiner*—Earl C. Thomas
*Attorney*—Kemon, Palmer & Estabrook

[57] ABSTRACT

Mercury vapor contained in various gases, e.g., byproduct hydrogen gas generated by a mercury electrolytic cell producing caustic soda, is removed by a simple and effective method which comprises washing the mercury vapor contaminated gas with a dilute acid solution containing persulfate ions.

7 Claims, No Drawings

METHOD OF REMOVING MERCURY VAPOR FROM GASES

BACKGROUND OF THE INVENTION

This invention relates to the removal of mercury vapor from gases containing it as an impurity, and more particularly to the removal of it from byproduct hydrogen gas generated by mercury electrolytic cells used for caustic soda manufacture.

In recent years, with the rapid increase in demand for hydrogen gas in the industrial field, high purity has come to be required of the gas. The byproduct hydrogen gas generated from mercury electrolytic cells of brine is so higher in purity than hydrogen gases obtained by other manufacturing processes, that it is being used very preferably in the industrial field. However, this byproduct hydrogen gas contains mercury vapor fairly corresponding to the saturated vapor pressure at its temperature. Accordingly, this byproduct hydrogen gas is unsuitable for a semiconductor industry or any catalytic reaction. Moreover, when this gas is used in a food industry such as the manufacture of hardened oil available as the raw material for man-made butter, there is a danger of the mercury contained in the gas mixing with the food and causing harm to a human body. Thus, it is necessary to eliminate the mercury in the byproduct hydrogen gas beforehand by some means or other as completely as possible. There have been known the following methods of removing the mercury contained in the gas.

A. Low temperature processing:

This process comprises cooling the gas to such a low temperature as from −30° to −40° C under a normal pressure and liquifying the mercury vapor contained in it, thereby separating it from the gas. However, as a gigantic scaled refrigerating equipment and an apparatus for separating a liquid phase from a gas phase are required in this process, it is economically difficult to carry it out. Further, it is not easy to bring the mercury content in the gas after the purification according to this process to less than 0.01 mg/m$^3$.

B. Adsorptional processing:

This process comprises adsorbing the mercury in the gas to a molecular sieve or an adsorbent such as active charcoal usually under a high pressure. However, this process has the following defects. First, the adsorbing capacity of the adsorbent used for the mercury is so small that a large amount of adsorbent is required. Second, the desorption of the adsorbed mercury is so difficult that the recovery of metallic mercury is not easy. Third, the concentration of the mercury in the gas after the treatment is more than 0.1 mg/m$^3$, and it is very far from the standard mark. Finally, the necessity of a high pressure equipment causes this process to be uneconomical.

C. Washing with chlorine water:

This process comprises washing the mercury vapor containing gas with chlorine gas dissolved in water to change the mercury vapor into mercury chloride which is, in turn, dissolved in water. However, as some free chlorine gas may remain in the treated gas, another absorption tower is required to remove this free chlorine gas, the equipment and its operation would become very complicated. Moreover, the amount of the residual mercury in the gas treated by this process is from 0.03 to 0.08 mg/m$^3$, and it is far from the value of less than 0.01 mg/m$^3$ aimed as the standard mark.

D. Washing with acidic permanganate solution:

This process comprises washing the mercury vapor containing gas with a liquor which is obtained by dispersing in a dilute sulfuric acid about 30 percent in concentration the brown precipitate of a mercury and manganese compound produced by reacting mercury vapor in an aqueous solution containing a compound of manganese of valency greater than 3, and recovering mercury as mercury sulfate in the said liquor (cf. Japanese Pat. No. 532,910). However, as the semiconductor industry has a dislike for the mixing of heavy metal element in hydrogen gas to be used, it is not unavoidable that there is left some room for fear regarding this process which has the probabilities of manganese component mixing with hydrogen gas.

As described above, the methods proposed hitherto are not fully satisfactory from the technical or commercial point of view.

SUMMARY OF THE INVENTION

An object of this invention is to remove mercury vapor from gases containing it as an impurity, particularly from hydrogen gas generated by mercury electrolytic cells used for caustic soda manufacture, by a method involving easy operations and simple equipments.

Another object of this invention is to reduce the mercury content in the gas to less than 0.01 mg/m$^3$.

These objects may be attained in accordance with the present invention by washing mercury vapor containing gases with a dilute acid solution containing a small amount of persulfate ion at a normal temperature under a normal pressure.

DETAILED DESCRIPTION OF THE INVENTION

As a result of repeated research works conducted on the method of removing mercury vapor from gases with various washing solutions, we found that the use of a dilute acid solution containing persulfate ion ($S_2O_8^-$) had a most excellent effect as the washing solution.

Generally, persulfate ion which has a powerful oxidizing effect is in use industrially as an oxidant, a bleaching agent or a polymerization initiator for an ethylenic unsaturated compound. However, persulfates are relatively unstable compounds are not generally found to be a useful material.

After many experiments, we found a surprising fact that, even if the persulfate ion was in contact with hydrogen gas in an acid solution, the persulfate, except a part thereof consumed to the oxidation of the mercury vapor in the hydrogen gas, was extremely slow in the decomposition rate, and that the absorption rate of the mercury vapor scarcely lowered till no persulfate ion remained in the solution even after many hours of the gas flow.

As acids to be used, even oxalic acid and sulfamic acid are available in addition to sulfuric acid, hydrochloric acid and nitric acid. The optimum concentrations of these acids are represented by their from 10 to 30 percent solutions. On the other hand, the preferable initial concentration of persulfate ion in these acid solutions is from 0.5 to 1.5 percent by weight on the basis of the acid solutions.

The washing of the gases may be carried out at a normal temperature under a normal pressure.

When mercury vapor containing hydrogen gas is washed by the above-mentioned acid solution, the mercury in the gas is oxidized by the persulfate ion and a part of the oxidized material dissolves into the acid solution and the other part of it disperses therein, in the form of fine precipitate of black, yellow or red mercury oxide. If a part of the circulating acid solution is drawn off and the new acid solution of persulfate is replenished, the washing of the gas can be carried out continuously.

When sulfur dioxide gas is introduced into the used solution containing the precipitate to reduce the mercury oxide in the solution, liquid mercury metal can be separated and recovered almost completely. The dilute acid after the above-mentioned recovering may be used as an acid solution to be supplied to the above-mentioned circulating system by dissolving additional persulfate in it. When the amount of mercury contained in the dilute acid after recovering is to be reduced so as to harmlessly throw away said acid, it is possible to reduce the mercury content in the solution to less than 0.01 mg per liter by treating this solution with a chelate resin. Other reducing agents such as hydroquinone or sodium sulfite may be also used instead of above-mentioned sulfur dioxide.

Thus, according to the present invention, it is possible to remove nearly almost all of the mercury from mercury vapor containing hydrogen gas by a simple washing operation with a dilute acid solution dissolving a small amount of persulfate ion, and reduce the residual content of mercury in the treated gas to less than 0.01 mg per cubic meter. Furthermore, it is also possible to recover by a simple operation the mercury metal easily and almost completely from the waste acid solution after washing.

The above is a description about the removal of mercury from the byproduct hydrogen gas. Further, the process in this invention can be applied to other gases contaminated with mercury vapor as well.

EXAMPLE 1

One thousand liters of washing solution were prepared in which ammonium persulfate $(NH_4)_2S_2O_8$ of 1 weight percent on the basis of the following acid solution was dissolved in sulfuric acid aqueous solution of 20 percent concentration. An absorption tower 200 mm in the inside diameter and 1600 mm in the packing height was filled with Rasig rings 25 mm in the outside diameter, and the byproduct hydrogen gas generated from a mercury electrolytic cell using brine to generate caustic soda at a temperature of 20° C was passed through the tower from the bottom of the tower. The aforementioned washing solution was introduced circulatingly into the tower from the top thereof to flow down through the packing layer, and thus the purification of the gas was carried out under a normal pressure. The temperature of the byproduct hydrogen gas was 15° C and the mercury content in the gas was 12 mg per cubic meter.

The concentrations of mercury in the gas at the tower outlet were measured in the four cases where the flow rate of the gas in the tower was, 40 m³ per hour and 80 m³ per hour respectively, and where the flow rate of the washing solution in the tower was 0.5 m³ per hour, 1.0 m³ per hour respectively. The resultant concentrations of mercury in every case were all less than 0.01 mg per cubic meter.

EXAMPLE 2

With 1000 liters of the same washing solution and same absorption tower as in Example 1, the purification was carried out consecutively of the byproduct hydrogen gas which was generated from a mercury electrolytic cell of brine at a temperature of 20° C, and whose mercury content was 16 mg per cubic meter.

The flow rate of the gas in the tower was made 40 m³ per hour and that of the washing solution in the tower 0.5 m³ per hour. The concentration of mercury in the gas at the tower outlet was measured after the lapse of 700 hours, and it was less than 0.01 mg per cubic meter. After this experiment was over, 15 liters of the used washing solution containing 1.5 g of mercury component per 100 g of it were reacted for 5 hours with sulfur dioxide gas introduced therein at a temperature of 60° C under a gauge pressure of 200 mm aq., and thus the free mercury metal was recovered. The recovering yield of mercury metal was 99.9 per cent.

Even after the separation of this free mercury, the washing solution still contained a trace of mercury ion to some extent. By passing the solution through a packed bed of chelate resin, the mercury content in the solution could be reduced to less than 0.01 mg per liter.

EXAMPLE 3

A washing solution was prepared in which potassium persulfate $K_2S_2O_8$ of 0.5 weight percent on the basis of the following acid solution was dissolved in nitric acid aqueous solution of 25 percent concentration. With this washing solution and the same absorption tower as in Example 1, a purification was carried out of the byproduct hydrogen gas which was generated from a mercury electrolytic cell using brine to make caustic soda at a temperature of 20° C and whose mercury content was 16 mg per cubic meter. The concentration of mercury in the gas at the tower outlet was measured, making the flow rate of the gas in the tower 100 m³ per hour and that of the washing solution in the tower 1.0 m³ per hour, and it was less than 0.01 mg per cubic meter.

What we claim is:

1. A method of recovering mercury vapor from a gas contaminated with it comprising washing said gas with a water solution of acid selected from the group consisting of sulfuric acid, hydrochloric acid, nitric acid, oxalic acid and sulfamic acid, containing persulfate ions, the concentration of said acid solution being in the range of from 10 to 30 percent by weight and the initial concentration of said persulfate ions being in the range of from 0.5 to 1.5 weight percent on the basis of the total weight of said acid solution.

2. The method according to claim 1 wherein the washing is carried out at a normal temperature under a normal pressure.

3. The method of claim 1 wherein said gas is contacted with said acid solution by countercurrent flow through a packed tower.

4. The method of claim 1 wherein mercury metal is recovered from the acid solution obtained by said washing by adding a reducing agent to said solution.

5. The method of claim 4 wherein said reducing agent is sulfur dioxide.

6. The method of claim 5 wherein the sulfur dioxide is introduced into the acid solution at about 60° C. and at a pressure above atmospheric pressure.

7. The method of claim 4 wherein the acid solution following recovery of mercury metal therefrom has additional persulfate dissolved therein and is recycled for further washing of mercury vapor containing gas.

* * * * *